US007138779B2

(12) United States Patent
Robert

(10) Patent No.: US 7,138,779 B2
(45) Date of Patent: Nov. 21, 2006

(54) METHOD OF MANAGING THE OPERATION OF A SEAT, AND A SEAT IMPLEMENTING THE METHOD

(75) Inventor: Jean-Claude Robert, Le Raincy (FR)

(73) Assignee: Messier-Bugatti, Velizy Villacoublay (FR)

( * ) Notice: Subject to any disclaimer, the term of this patent is extended or adjusted under 35 U.S.C. 154(b) by 0 days.

(21) Appl. No.: 10/967,275

(22) Filed: Oct. 19, 2004

(65) Prior Publication Data

US 2005/0088129 A1 Apr. 28, 2005

(30) Foreign Application Priority Data

Oct. 24, 2003 (FR) .................................. 03 12496

(51) Int. Cl.
*G05B 5/00* (2006.01)

(52) U.S. Cl. ................ 318/466; 318/568.17; 318/282; 318/286

(58) Field of Classification Search ................ 318/466, 318/568.17, 568.19, 652, 282, 286, 648, 318/568.16, 615, 625, 626, 647, 467, 468; 29/407.05
See application file for complete search history.

(56) References Cited

U.S. PATENT DOCUMENTS 5,378,975 A * 1/1995 Schweid et al. ............ 318/685
6,208,497 B1 * 3/2001 Seale et al. ................ 361/160
2002/0113478 A1 8/2002 Kasahara

FOREIGN PATENT DOCUMENTS

FR 2740744 5/1997
FR 2806674 9/2001
FR 2816184 5/2002

* cited by examiner

*Primary Examiner*—Karen Masih
(74) *Attorney, Agent, or Firm*—Young & Thompson

(57) ABSTRACT

The invention relates to a method of managing the operation of a seat (10) fitted with an actuator (24) including means (42, 44) for monitoring at least one variable characteristic of the force produced by the actuator (24), means (41) for measuring the position of the actuator, and means (36) for controlling the actuator, the method comprising the steps consisting in:

- measuring the or each characteristic variable;
- evaluating the or each characteristic variable on the basis of a predetermined evaluation criterion; and
- while the actuator is in operation, implementing an appropriate action on the seat as a function of the result of said evaluation.

Said evaluation comprises a step of measuring the position of the actuator. Said evaluation criterion for the or each measured characteristic variable as used for said evaluation depends on the position of the actuator.

6 Claims, 4 Drawing Sheets

METHOD OF MANAGING THE OPERATION OF A SEAT, AND A SEAT IMPLEMENTING THE METHOD

The present invention relates to a method of managing the operation of a seat fitted with an actuator including means for monitoring at least one variable characteristic of the force produced by the actuator, means for measuring the position of the actuator, and means for controlling the actuator, the method comprising the steps consisting in:

- measuring the or each characteristic variable;
- evaluating the or each characteristic variable on the basis of a predetermined evaluation criterion; and
- while the actuator is in operation, implementing an appropriate action on the seat as a function of the result of said evaluation.

BACKGROUND OF THE INVENTION

In passenger transport vehicles, such as airplanes and trains, it is known to provide seats that are fitted with electric actuators. Each seat generally includes leg rest and a seat back that are movable relative to a seat proper. The leg rest and the seat back are hinged to respective ends of the seat proper, and each is associated with an electric actuator enabling it to move. The seat itself is sometimes movable as a whole relative to the deck or floor under the control of an actuator.

In order to avoid the leg rest or the seat back injuring a passenger while it is moving, or indeed in order to avoid damaging baggage placed on the track of the moving element, it is known to measure continuously the electric current being drawn by each actuator. If current consumption exceeds a predetermined threshold value, then the actuator is stopped immediately.

When a seat element controlled by an actuator encounters an obstacle, that element is stopped or braked. The electric motor of the actuator driving the element is then blocked, so the current drawn by the motor increases in very significant manner. Stopping the actuator whenever high current is detected in its motor serves to avoid damaging the seat or the obstacle it has encountered.

The current thresholds that lead to stopping are set at relatively high values in order to enable the actuator to be capable of operating while exerting a large force on the seat or the seat element during normal displacement.

Under certain circumstances, even when no obstacle is encountered, it is necessary for an actuator to be capable of producing a large force in order to move a moving element, in particular because of the way the seat is designed. This applies, for example, when a seat element needs to travel up a ramp while it is moving.

Thus, in certain circumstances, the protection provided by making use of a current threshold can be insufficient for providing effective protection to baggage, to the limb of a passenger, or to the seat itself.

OBJECTS AND SUMMARY OF THE INVENTION

An object of the invention is to provide a method of managing the operation of a seat which further reduces the risk of injuries for a passenger and which increases the lifetime of the seat.

To this end, the invention provides a method of the above-specified type for managing the operation of a seat, wherein said evaluation includes a step of measuring the position of the actuator; and said criterion for evaluating the or each measured characteristic variable used for said evaluation depends on the position of the actuator.

In particular implementations, the method may include one or more of the following characteristics:

- the appropriate action is causing the actuator to operate in the direction opposite to the direction requested by the control means;
- at least one variable characteristic of the force produced by an actuator is a variable characteristic of the current drawn by the actuator;
- said characteristic variable is the current drawn by the actuator, and said predetermined evaluation criterion comprises comparing the current drawn with a predetermined threshold of a value that depends on the position of the actuator; and
- said characteristic variable is the time derivative of the current drawn by the actuator, and the predetermined evaluation criterion comprises comparing the time derivative of the current drawn with a predetermined threshold of a value that depends on the position of the actuator.

The invention also provides a vehicle seat of the type including an actuator for moving at least one element of the seat, means for measuring the position of the actuator, a unit for managing operation of the seat including means for monitoring at least one variable characteristic of the force produced by the actuator, evaluation means for evaluating the or each characteristic variable on the basis of at least one predetermined evaluation criterion, and means that are operative while the actuator is in operation to implement an appropriate action on the seat as a function of the result of said evaluation, wherein said evaluation means are adapted to make use of a predetermined evaluation criterion that depends on the position of the actuator.

BRIEF DESCRIPTION OF THE DRAWINGS

The invention will be better understood on reading the following description given purely by way of example and made with reference to the accompanying drawings, in which.

MORE DETAILED DESCRIPTION

Figure 1:
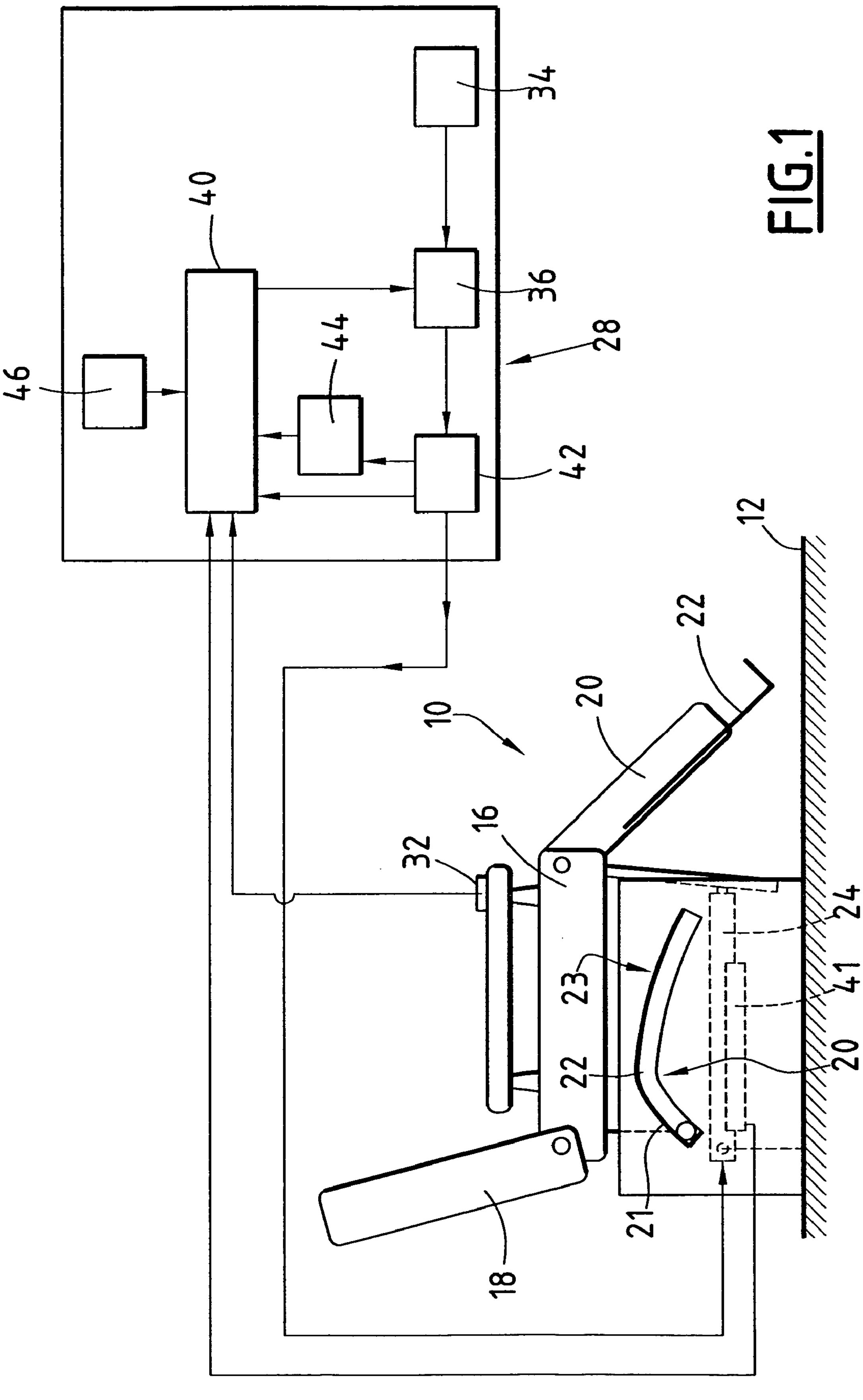
FIG. 1 is a diagrammatic view of a vehicle seat of the invention shown in a first position.

The seat 10 shown in FIG. 1 is an airplane passenger seat. The seat stands on the floor 12 of the airplane.

The seat comprises a movable structure 14 that is movable relative to the floor 12 and on which there rests a substantially horizontal seat proper 16. The seat further comprises a stand 17 secured to the floor and relative to which the structure 14 is movable. The stand comprises two parallel vertical walls between which the structure 14 is guided.

At one end of the seat proper there is hinged a seat back 18.

At the other end of the seat proper 16, there is hinged a leg rest 20 that is movable between a position in which it is folded substantially vertically down from the seat proper 16, and an extended position in which it extends the seat proper 16 substantially horizontally.

The seat 10 further comprises a foot rest 22 mounted to slide relative to the leg rest 20 and in line therewith.

Electric actuators (not shown) are fitted to the seat to move the seat back, the leg rest, and the foot rest.

Figure 2:
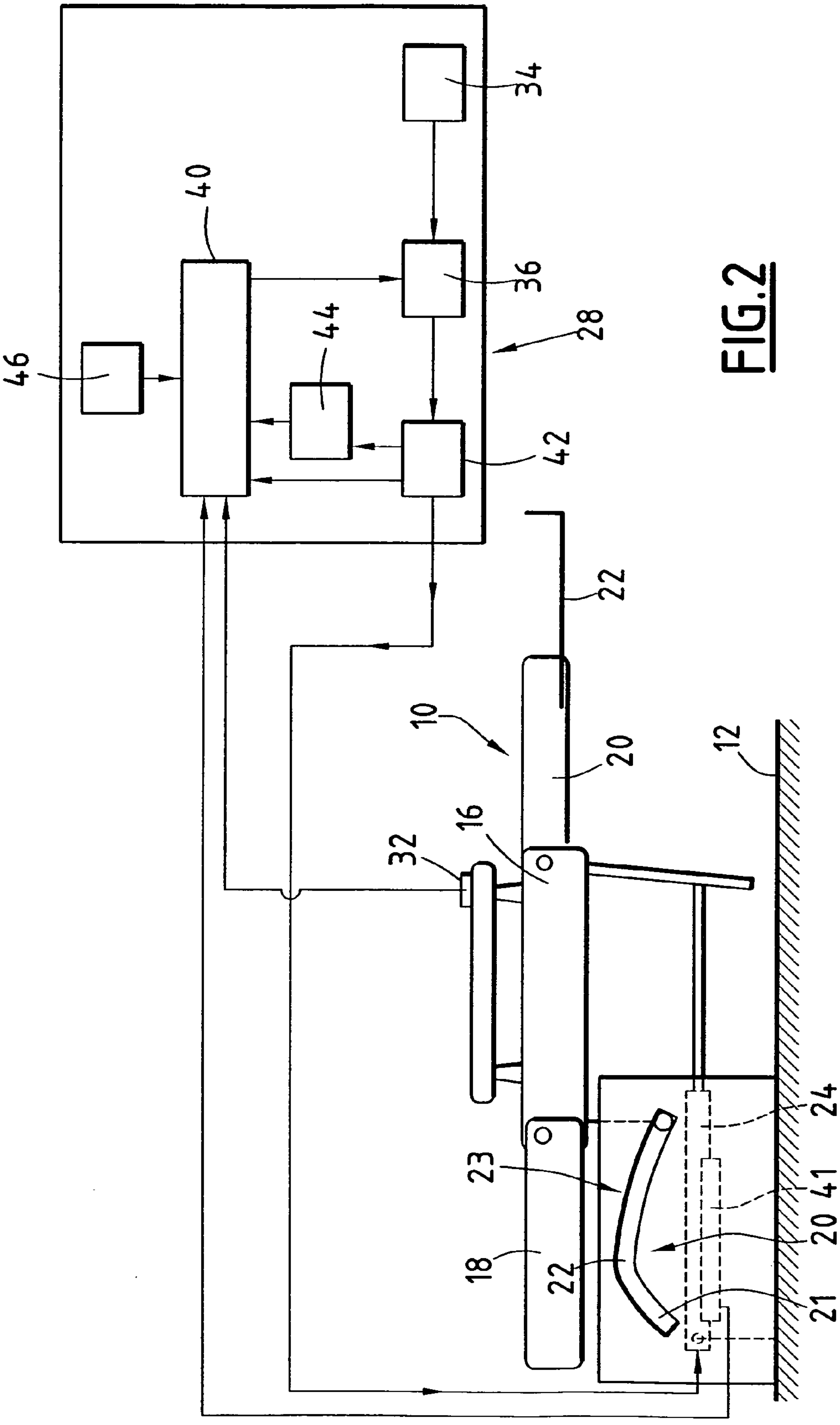
FIG. 2 is a diagrammatic view of the FIG. 1 seat shown in a second position.

In addition, an electric actuator 24 is mounted between the movable structure 14 and the stand 17 so as to move the seat underframe, and thus the seat, between a backward position shown in FIG. 1 and a forward position shown in FIG. 2.

The backward position of the seat corresponds to the passenger being in a sitting position with the seat back raised. In contrast, the forward position of the seat enables the seat back to be tilted down without getting in the way of the passenger situated behind. Thus, the forward position of the seat corresponds to a prone position of the passenger.

To move the seat, cam-follower wheels provided on either side of the movable structure 14 of the seat are guided in cam tracks 20 formed in the vertical walls of the stand 17. These two tracks are identical and are constituted by slots formed in the vertical walls.

Each track 20 is of varying height. Starting from the position in which the follower wheel is located when the seat is in its backward position, the track presents an upward ramp 21 extended beyond its top 22 by a downward ramp 23 whose bottom end corresponds to the position of the follower wheel of the underframe when the seat is in its fully forward position.

Thus, when moving from one extreme position to the other, the movable structure 14 moves up one of the ramps to the top of the track and then moves down beyond the top under the control of the actuator 24.

For greater clarity in the description below, the seat is said to move relative to the floor, although it is only the movable structure that moves, while the seat stand 17 remains stationary.

The presence of the upward ramp 21 enables the seat to be retained mechanically in positive manner in its extreme rearward position, which corresponds to the position required when landing the airplane. Thus, in the event of the actuator 24 failing, the ramp 21 prevents the seat from being capable of moving forward while the aircraft is braking, with the deceleration force that is then applied to the seat then being opposed by the retaining force applied by the upward ramp 21.

The actuator 24 is electrically powered from a unit 28 for managing the operation of the seat. The other actuators (not shown) are likewise connected to the management unit 28 to be powered and controlled thereby.

In addition, the seat includes a control pad 32 enabling the actuator 24 to be controlled for the purpose of causing the movable structure 14 of the seat to move.

The control pad 32 is connected to the unit 28 for managing operation of the seat.

The unit 28 includes a power supply 34 for the actuator 24. The power supply is constituted, for example, by a transformer connected to the general electricity power supply network of the airplane via suitable connection means.

In addition, a power supply interface 36 for powering the actuator 24 is provided at the outlet from the power supply 34. This interface serves to determine how electricity is fed to the actuator as a function of the desired travel direction and travel speed.

The power supply interface 36 is controlled by a central processor unit (CPU) 40. This CPU 40 is connected to the control pad 32 in order to receive instructions from the user.

For control purposes, the actuator 24 includes a transducer 41, such as a potentiometer, suitable for delivering information representative of the present position of the actuator, i.e. the real position of the seat element controlled by the actuator. This potentiometer is connected to the CPU 40 to provide it with position information.

The CPU 40 runs an actuator control program of any suitable type in which there are provided two particular management routines that are described in the description below with reference to FIG. 3.

Between the power supply interface 36 and the actuator 24 there are disposed means 42 for monitoring a variable that is characteristic of the electric current drawn by the actuator 24 while in operation.

The monitor means 42 are connected to the CPU 40.

The monitor means 42 are adapted to measure the instantaneous current i drawn by the actuator 24 while it is in operation.

The central management unit 28 further includes differential means 44 with input connected to the monitor means 42 and output connected to the CPU 40. The differential means are adapted to deliver the time derivative of the instantaneous current i, written $$\frac{di}{dt}.$$

Thus, the CPU 40 continuously receives both the value i of the current drawn by the actuator 24 and the value $$\frac{di}{dt}$$

of the time derivative of the current being drawn.

In addition, memory means 46 are connected to the CPU 40. These memory means contain pairs of predetermined threshold values that are used for stopping the actuator, in the event of these values being exceeded by certain values measured on the actuator. These pairs are written respectively $(I_1, D_1)$ and $(I_2, D_2)$ for controlling the actuator 24 in the forward direction going from the rearward position towards the forward position. In order to control the actuator in the opposite direction, other pairs of values $(I_1', D_1')$ and $(I_2', D_2')$ are stored.

In addition, a switch-over value $x_s$ is stored. This value corresponds to the value delivered by the transducer 41 when the follower wheel is at the top 21 of the track.

In the description below, only the circumstance of the actuator 24 moving in the forward direction to cause the seat to go from its extreme rearward position towards its extreme forward position is described in detail.

The pairs $(I_1, D_1)$ and $(I_2, D_2)$ are stop thresholds for the actuator 24, which thresholds are continuously compared with the current value i and with its time derivative $$\frac{di}{dt}.$$

The thresholds $(I_1, D_1)$ are used while the follower wheel is going up to the top 22 of the track, while the thresholds $(I_2, D_2)$ are used while the follower wheel is going down from the top 22.

To operate the seat, the CPU 40 runs a conventional program adapted to cause the power supply interface 36 to power the actuator 24 in one direction or the other by reversing the current flow direction, as a function of information received from the control pad 32.

Figure 3:
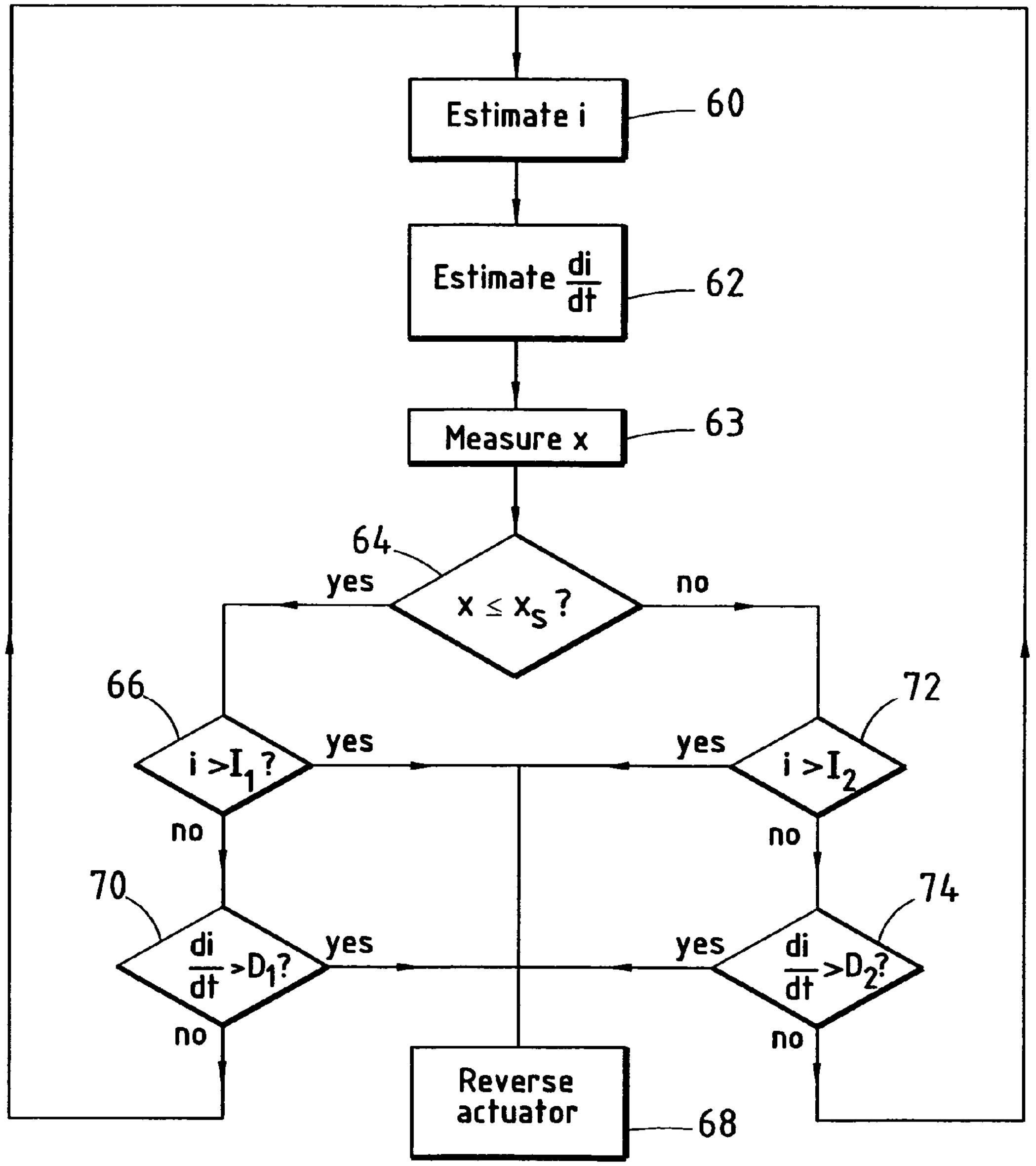
FIG. 3 is a flow chart for the algorithm implemented by the central processor unit for managing operation of the FIG. 1 seat.
Figure 4A:
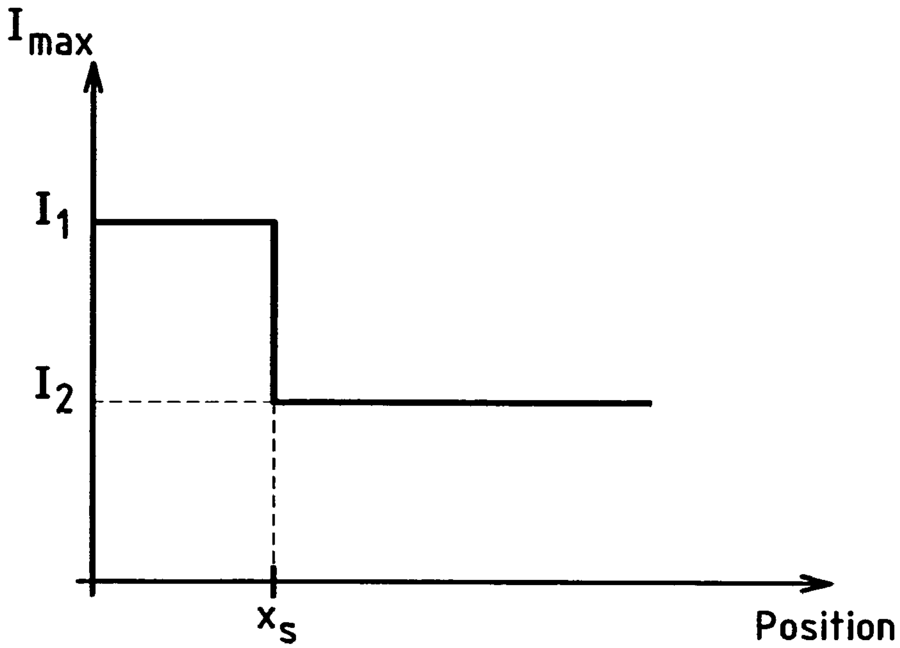
FIGS. 4A and 4B are curves showing how the current and the current derivative thresholds vary as a function of the position of the actuator.
Figure 4B:
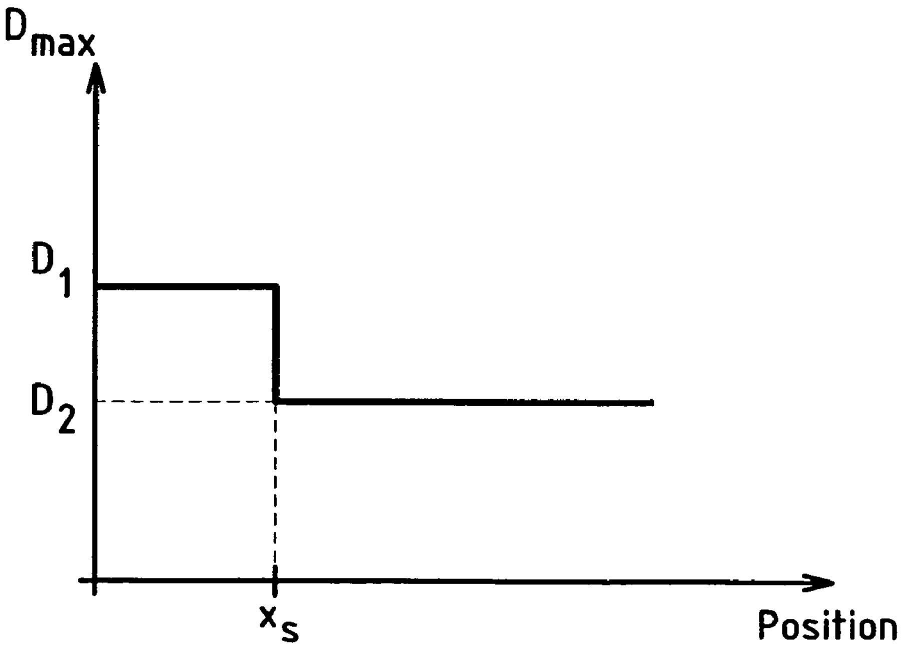

In addition, while the actuator 24 is operating in a forward, first direction seeking to move the seat from its rearward position towards its forward position, the CPU 40 continuously runs a routine whose algorithm is shown in FIG. 3. The successive steps of the algorithm are implemented in a loop. An analogous algorithm with the threshold value pairs ($I_1$', $D_1$') and ($I_2$', $D_2$') is implemented while the seat is moving from its forward position towards its rearward position.

The algorithm comprises firstly a step 60 of estimating the current i drawn by the actuator 24. The current i is delivered by the monitor means 42.

In the following step 62, the CPU 40 picks up an estimate of the time derivative $$\frac{di}{dt}$$

of the current drawn. This estimate is delivered by the differential means 44.

In step 63, the position written x of the actuator 24 is measured by the potentiometer 41.

During the following step referenced 64, the CPU 40 determines the position of the actuator 24 relative to the switch-over value $x_s$ corresponding to the position of the actuator when the follower wheel is at the top 22 of the track 20.

Depending on whether the actuator 24 is going towards or away from the position corresponding to the value $x_s$, steps are implemented in one or other of the branches of the flow chart.

More precisely, if the follower wheel is going up to the top, i.e. if the value x of the position of the actuator is less than the value $x_s$, the current i is initially compared in step 66 with a first predetermined threshold $I_1$ stored in the means 46.

This first threshold value $I_1$ is determined experimentally and corresponds to a lower limit for current consumption by the actuator 24 in the event of the seat striking an obstacle while the seat is climbing the upward slope 21. The first threshold value $I_1$ is set at a relatively high level.

If the current value i delivered by the monitor means 42 is greater than the first threshold value $I_1$, then the actuator is instructed to reverse over a short stroke in a step 68 by the CPU 40 controlling the interface 36 for this purpose. Reversing is performed during a predetermined short period of time, for example, during which the motor of the actuator is set into rotation in the reverse direction.

In a variant, the actuator is reversed over a predetermined short stroke.

Otherwise, if the current i is less than the first threshold value $I_1$, then test step 70 is implemented. During this step, the value of the time derivative $$\frac{di}{dt}$$

of the current i drawn by the actuator 24 is compared with a first threshold value $D_1$, stored in the memory means 46.

The first threshold value $D_1$ corresponds to a lower limit for the time derivative of the current drawn by the actuator 24 in the event of the seat 20 encountering an obstacle while moving up the ramp 21. The first threshold value $D_1$ is set at a relatively high level.

If the estimated value of the time derivative $$\frac{di}{dt}$$

of the drawn current i is greater than the first threshold value $D_1$, then the actuator 24 is caused to reveres briefly in step 68. Otherwise, if this condition is not satisfied, the actuator is not stopped and step 60 is implemented again.

If the follower wheel is going down from the top 22, i.e. if during the test performed in step 64 the value x delivered by the potentiometer 41 is greater than $x_s$, then the estimated current i is compared in step 72 with a second threshold value $I_2$ stored in the memory means 46.

This second threshold value $I_2$ is less than the corresponding first threshold value $I_1$. It is determined experimentally and it corresponds to a lower limit for current consumption by the actuator 24 in the event of the seat encountering an obstacle impeding free movement of the seat while the seat is going down the ramp 23.

In step 72, if the estimated value i is greater than the second threshold value $I_2$, the actuator 24 is caused to reverse briefly in step 68. Otherwise, if this condition is not satisfied, the value of the time derivative $$\frac{di}{dt}$$

of the current i drawn by the actuator 24 is compared in step 74 with a second predetermined threshold value $D_2$.

This second predetermined threshold value $D_2$ is determined experimentally. It corresponds to a lower limit for the time derivative of the current drawn by the actuator 24 in the event of the seat encountering an obstacle while going down the ramp 23. This second threshold value $D_2$ is less than the corresponding first threshold value $D_1$.

If the value $$\frac{di}{dt}$$

is greater than the second threshold value $D_2$, then the actuator 24 is caused to reverse briefly in step 68. Otherwise, step 60 is implemented again.

It will be understood that depending on the position of the actuator 24, the value of the drawn current i and also its first derivative $$\frac{di}{dt}$$

relative to time are compared with two respective predetermined thresholds.

If the current or its first derivative exceeds the corresponding threshold value, then the actuator is caused to reverse briefly, so as to prevent the seat continuing its travel since that might injure the passenger, damaging some baggage, or even damage the seat itself.

Nevertheless, insofar as the forces that need to be applied by the actuator 24 differ depending on the direction in which the ramps 21 and 23 slope, even in the absence of an obstacle, the predetermined threshold values are likewise different.

While the seat is moving up the ramp 21, the weight of the seat opposes movement thereof, so that the current drawn by the actuator is generally high, even in the absence of an obstacle. Thus, the threshold $I_1$ is set at a value that is high, since otherwise it would not be possible to move the seat.

In contrast, when the seat is moving down the ramp 23, the current drawn by the actuator is very small in the absence of any obstacle since the seat is driven by its own weight and possibly also by the weight of the passenger. Thus, a very small threshold value $I_2$ can be used.

In both cases, a very high degree of safety is guaranteed both for the seat and for the passenger since displacement of the seat is stopped as soon as it encounters an obstacle, without a high level of force being applied to the obstacle.

Setting the threshold $I_1$ at a value that is high does not prevent a very low safety threshold being used during displacement of the seat towards its forward position, thereby considerably improving safety while the seat is in operation.

Thus, the use of distinct thresholds depending on the position of the actuator makes it possible to refine the method of managing the operation of the seat, avoiding untimely stops of the actuator, of the kind that have been observed when only one threshold is implemented.

Similarly, the thresholds used for comparison with the time derivative of the current drawn by the actuator can likewise be fixed at different levels depending on the position of the actuator.

It will be understood that such a method of monitoring can also be implemented for actuators controlling the displacement of other parts of the seat, in particular for an actuator driving the hinged seat back.

In the embodiment described herein, the instantaneous current and its first derivative relative to time are compared with distinct threshold values as a function of the position of the actuator. Nevertheless, more generally, it is possible to use any type of variable that is characteristic of the force produced by the actuators during utilization. Thus, in a variant, the variables characteristic of current consumption as described above, which variables are representative of the force applied by the actuator, are replaced by the torque delivered by the actuator or by the power delivered thereby. In particular, the monitor means described are then replaced by torque sensors, and the comparisons that are performed are then implemented on the torques as measured.

In addition, in another variant, when one of the predetermined thresholds is crossed, instead of causing the actuator to operate in the opposite direction, as described above, the actuator is merely stopped.

In the example described above, the displacement stroke of the actuator is subdivided into two zones which are associated with distinct thresholds for comparison with the current and with its first derivative.

In a variant, the stroke of the actuator is subdivided into more than two zones, and as many predetermined threshold values are used as there are zones.

In yet another variant, the threshold value with which current or its first derivative is compared is defined as a function of the position of the actuator. By way of example, this function may be an affine function or a piecewise affine function.

What is claimed is:

1. A method of managing the operation of a seat (10) fitted with an actuator (24) including means (42, 44) for monitoring at least one variable characteristic of the force produced by the actuator (24), means (41) for measuring the position of the actuator, and means (36) for controlling the actuator, the method comprising the steps consisting in:

measuring the or each characteristic variable;

evaluating the or each characteristic variable on the basis of a predetermined evaluation criterion; and while the actuator is in operation, implementing an appropriate action on the seat as a function of the result of said evaluation;

wherein said evaluation includes a step of measuring the position of the actuator; and said criterion for evaluating the or each measured characteristic variable used for said evaluation depends on the position of the actuator.

2. A method of managing the operation of a seat according to claim 1, wherein the appropriate action is causing the actuator (24) to operate in the direction opposite to the direction requested by the control means (36).

3. A method of managing the operation of a seat according to claim 1, wherein at least one variable characteristic of the force produced by an actuator is a variable characteristic of the current drawn by the actuator.

4. A method of managing the operation of a seat according to claim 3, wherein said characteristic variable is the current drawn by the actuator, and said predetermined evaluation criterion comprises comparing the current drawn with a predetermined threshold of a value that depends on the position of the actuator.

5. A method of managing the operation of a seat according to claim 3, wherein said characteristic variable is the time derivative of the current drawn by the actuator, and the predetermined evaluation criterion comprises comparing the time derivative of the current drawn with a predetermined threshold of a value that depends on the position of the actuator.

6. A vehicle seat (10) of the type including an actuator (24) for moving at least one element of the seat, means (41) for measuring the position of the actuator (24), a unit (28) for managing operation of the seat including means (42, 44) for monitoring at least one variable characteristic of the force produced by the actuator (24), evaluation means (40) for evaluating the or each characteristic variable on the basis of at least one predetermined evaluation criterion, and means that are operative while the actuator is in operation to implement an appropriate action on the seat as a function of the result of said evaluation, wherein said evaluation means (40) are adapted to make use of a predetermined evaluation criterion that depends on the position of the actuator.

* * * * *